(12) United States Patent
Sako et al.

(10) Patent No.: US 6,700,845 B1
(45) Date of Patent: Mar. 2, 2004

(54) MULTI-LAYER OPTICAL RECORDING MEDIUM AND METHOD AND APPARATUS FOR REPRODUCING OPTICAL DATA

(75) Inventors: Yoichiro Sako, Tokyo (JP); Takao Ihashi, Chiba (JP); Tatsuya Inokuchi, Kanagawa (JP); Hiroshi Ogawa, Kanagawa (JP); Masanobu Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 437 days.

(21) Appl. No.: 09/762,660
(22) PCT Filed: Jun. 8, 2000
(86) PCT No.: PCT/JP00/03738
   § 371 (c)(1),
   (2), (4) Date: Feb. 9, 2001
(87) PCT Pub. No.: WO00/77783
   PCT Pub. Date: Dec. 21, 2000

(30) Foreign Application Priority Data
Jun. 10, 1999 (JP) .......... 11-164446

(51) Int. Cl.$^7$ .......... G11B 3/90
(52) U.S. Cl. .......... 369/53.22; 369/94; 369/283
(58) Field of Search .......... 369/44.27, 44.29, 369/44.35, 53.2, 53.22, 94, 275.5, 283, 288; 428/64.1

(56) References Cited

U.S. PATENT DOCUMENTS

| | | | | |
|---|---|---|---|---|
| 5,883,877 A | * | 3/1999 | Nishizawa | 369/275.1 |
| 6,033,752 A | * | 3/2000 | Suzuki et al. | 428/64.1 |
| 6,343,060 B1 | * | 1/2002 | Ko | 369/275.1 |

* cited by examiner

Primary Examiner—Paul W. Huber
(74) Attorney, Agent, or Firm—Jay H. Maioli (57) ABSTRACT

An optical disc having a protection layer for protecting a recording layer located farther from a substrate and having a first recording layer and a second recording layer stacked on one side of the substrate, wherein the reflectance of one of the first and second recording layers is made higher than the reflectance of the other recording layer, and a reproducing device which uses this optical disc. The reproducing device casts a light beam emitted from a single light source onto the first recording layer or the second recording layer via a single objective lens, discriminates which of the first recording layer and the second recording layer the light beam emitted from the light source is cast on, on the basis of the result of detection of a reflected beam from the first recording layer or the second recording layer, moves the objective lens in a direction parallel to the optical axis of the objective lens on the basis of the result of discrimination, and condenses the light beam on the first recording layer or the second recording layer so as to carry out reproduction of information.

25 Claims, 3 Drawing Sheets

MULTI-LAYER OPTICAL RECORDING MEDIUM AND METHOD AND APPARATUS FOR REPRODUCING OPTICAL DATA

This application is a 371 of PCT/JP00/03738, filed Jun. 8, 2000.

TECHNICAL FIELD

This invention relates to an optical disc and an optical disc reproducing device which uses this optical disc, and particularly to an optical disc which has a plurality of recording layers and an optical disc reproducing device which uses this optical disc.

BACKGROUND ART

Conventionally, as a recording medium for various types of information such as audio information and video information, there has been broadly used an optical disc such that information recorded thereon is reproduced using a laser beam. For this type of optical disc, an optical disc having multiple recording layers has been proposed in order to realize further increase in the quantity of information that can be recorded.

As an optical disc having multiple recording layers, there has been proposed an optical disc as described in the Japanese Publication of Unexamined Patent Application No. Hei 8-235641.

Figure 1:
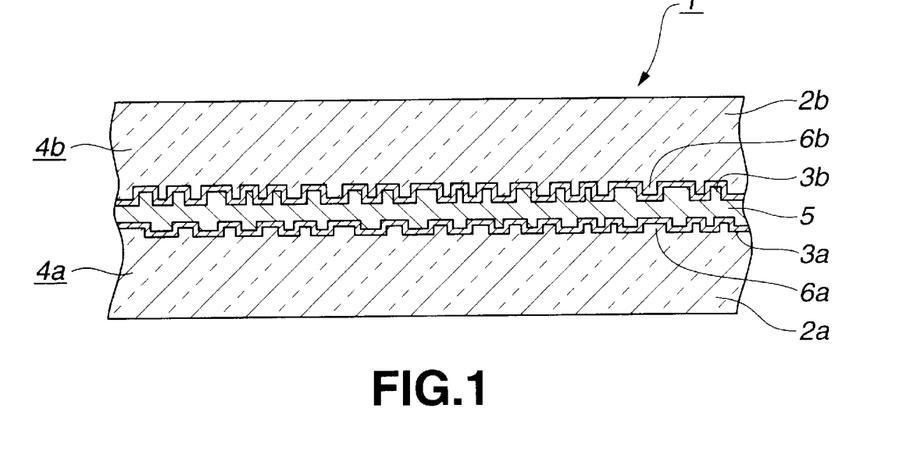
FIG. 1 is a cross-sectional view showing a conventional optical disc.

In the optical disc 1 described in this publication, a first recording carrier 4a constituted by forming a first recording layer 3a on one side of an optically transparent first substrate 2a and a second recording carrier 4b constituted by forming a second recording layer 3b on one side of an optically transparent second substrate 2b are arranged in such a manner that the sides where the first and second recording layers 3a and 3b are formned face each other, and these first and second recording carriers 4a and 4b are joined with each other via an optically transparent adhesive layer 5, as shown in FIG. 1.

On the side where the first and second recording layers 3a and 3b are formed, of the first and second substrates 2a and 2b constituting the first and second recording carriers 4a and 4b, information such as video information is recorded in the form of pit patterns 6a and 6b made of minute recesses and protrusions. On the pit pattern 6a provided on the first recording carrier 4a, the first recording layer 3a is formed by depositing a semitransparent film of SiO, $SiO_2$ or the like along the pit pattern 6a by evaporation or sputtering. The first recording layer 3a has a reflectance of 20 to 50% and an optical transmittance of 30 to 80%. On the pit pattern 6b provided on the second recording carrier 4b, the second recording layer 3b is formed by depositing an aluminum evaporation film along the pit pattern 6b. The second recording layer 3b has a reflectance of 60% or higher, but the reflectance of a laser beam transmitted through the first recording layer 3a and reflected by the second recording layer 3b is 20 to 50%.

With such an optical disc 1 having the first recording layer 3a which is optically semitransparent, information recorded on the second recording layer 3b can be reproduced by casting a laser beam $L_2$ from the same direction as the direction of casting a laser beam $L_1$ to the first recording layer 3a, as shown in FIG. 1. In this case, selection of either the information recorded on the first recording layer 3a or the information recorded on the second recording layer 3b is carried out by changing the focal positions of the laser beams $L_1$ and $L_2$ cast onto the optical disc 1.

Figure 2:
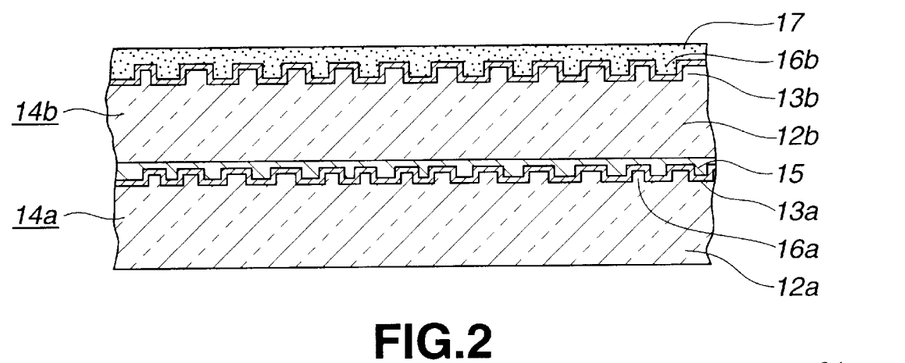
FIG. 2 is a cross-sectional view showing another example of the conventional optical disc.

As another optical disc having multiple recording layers, an optical disc as shown in FIG. 2 has been proposed. In this optical disc 11, a first recording carrier 14a constituted by forming a first recording layer 13a on one side of an optically transparent first substrate 12a and a second recording carrier 14b constituted by forming a second recording layer 13b on one side of an optically transparent second substrate 12b are joined with an adhesive layer 15 made of an optically transparent ultraviolet-cured resin or the like, as shown in FIG. 2. The first and second recording layers 14a and 14b are joined in parallel in such a manner that the second substrate 12b is located on the first recording layer 13a. On the second recording layer 13b, a protection layer 17 for protecting the second recording layer 13b is provided.

On the sides where the first and second recording layers 13a and 13b are formed, of the first and second substrates 12a and 12b constituting the first and second recording carriers 14a and 14b, information such as audio information is recorded in the form of pit patterns 16a and 16b made of minute recesses and protrusions. On the pit pattern 16a provided on the first recording carrier 14a, the first recording layer 13a having wavelength selectivity is formed along the pit pattern 16a. The first recording layer 13a is formed, for example, as a five-layer film made up of $Si_3N_4$, $SiO_2$, $Si_3N_4$, $SiO_2$, and $Si_3N_4$. The first recording layer 13a has a reflectance of approximately 34% for a laser bean with a wavelength of 635 nm, and has a reflectance of approximately zero for a laser beam with a wavelength of 780 nm and thus substantially transmits this laser beam.

On the pit pattern 16b provided on the second recording carrier 14b, the second recording layer 13b is formed by depositing an aluminum evaporation film with a high reflectance along the pit pattern 16b. The second recording layer 13b has a reflectance of 80% or higher for the laser beam transmitted through the first recording layer 13a. The second recording layer 13b has a reflectance of 84% or higher for the laser beam with a wavelength 780 nm, which is substantially transmitted through the first recording layer 13a, and has a reflectance of approximately 38% for the laser beam with a wavelength of 635 nm, which is reflected approximately 34% through the first recording layer 13a.

In the optical disc 11 thus constituted, information recorded on the first and second recording layers 13a and 13b is reproduced by casting a laser beam from the side of the substrate 12a of the first recording carrier 14a. In this case, if a laser beam $L_3$ with a wavelength of 780 nm is used as a laser beam for reading the information, this laser beam is transmitted through the first recording layer 13a and cast onto the second recording layer 13b, and a return laser beam reflected from the second recording layer 13b is obtained. By detecting this return laser beam, the information such as audio information recorded on the second recording layer 13b is read and reproduced. The laser beam $L_3$ with a wavelength of 780 nm is what is used for reproduction of an optical disc using a reproduction-type optical disc with a diameter of 12 cm, that is, a so-called compact disc, as a recording medium. Therefore, the information recorded on the second recording layer 13b can also be reproduced by a general-purpose optical disc reproducing device.

If a laser beam $L_4$ with a wavelength of 635 nm is cast from the side of the substrate 12a of the first recording carrier 14a, a return laser beam reflected from the first recording layer 13a and the second recording layer 13b can be obtained. Specifically, since the first recording layer 13a has a reflectance of approximately 34% for the laser beam with a wavelength of 635 nm, this laser beam is transmitted through the first recording layer 13a and becomes incident on the second recording layer 13b, and a return laser beam reflected from the second recording layer 13b is obtained. The reflectance for the laser from the second recording layer 13b in this case is approximately 34%.

In this optical disc 11, by using the laser beam $L_4$ with a wavelength of 635 nm and setting the focal position of the laser beam $L_4$ on the first or second recording layer 13a or 13b, the information recorded on the first or second recording layer 13a or 13b can be reproduced.

In the optical disc 1 shown in FIG. 1 in which the first and second recording carriers 4a and 4b are joined in such a manner that the sides having the first and second recording layers 3a and 3b formed thereon face each other, reproduction of the information recorded on the first or second recording layer 3a or 3b can be selectively carried out by setting the focal position of the laser beam cast onto the optical disc 1 to the first or second recording layer 3a or 3b, as described above. In the optical disc 1, since the first and second recording layers 3a and 3b are arranged closely to each other, a detection error tends to occur in the case of detecting the focal position of the laser beam and detecting the first or second recording layer 3a or 3b. Therefore, it is difficult to securely focus the laser beam to a desired one of the first and second recording layers 3a and 3b, and to accurately reproduce desired information.

It is conceivable to detect the difference in reflectance between the first and second recording layers 3a and 3b and thus detect which of the first and second recording layers 3a and 3b is the layer on which the laser beam cast on the optical disc 1 is focused, thus selecting the first or second recording layer 3a or 3b. However, in this optical disc 1, since the first and second recording layers 3a and 3b have substantially the same reflectance for the laser beam cast on the optical disc 1, the difference in reflectance for the laser beam cannot be used for selecting the first or second recording layer 3a or 3b.

Meanwhile, in the optical disc 11 shown in FIG. 2 which has the first recording layer 13a having wavelength selectivity, the information recorded on the first recording layer 13a can be reproduced by a general-purpose optical disc reproducing device which uses the above-described compact disc as a recording medium, but a dedicated optical disc reproducing device which uses a laser beam with a wavelength of 635 nm is required for reproducing the information recorded on the first and second recording layers 13a and 13b. In the optical disc 11, too, the first and second recording layers 13a and 13b have substantially the same reflectance for the laser beam cast onto the optical disc 11, land therefore detection of the difference in reflectance for the laser beam cannot be used for selecting the first or second recording layer 13a or 13b.

As described above, though the conventionally proposed optical discs realize an increase in the quantity of recording information by providing multiple recording layers, it is difficult to select each recording layer and accurately focus a laser beam onto the selected recording layer. Therefore, it is not possible to easily and accurately reproduce desired information.

DISCLOSURE OF THE INVENTION

Thus, in view of the foregoing status of the art, it is an object of the present invention to provide an optical disc and an optical disc reproducing device which enable realization of multiple recording layers for increasing the recording capacity and accurate reproduction of information recorded in each recording layer.

It is another object of the present invention to provide an optical disc and an optical disc reproducing device which enable easy and accurate selection of a desired signal recording layer and accurate reproduction of desired information, using the difference in reflectance.

It is still another object of the present invention to provide an optical disc and an optical disc reproducing device which enable selective reproduction of a plurality of signal recording layers using a single laser beam.

It is still another object of the present invention to provide a highly general-purpose optical disc which enables reproduction by an optical disc reproducing device using a conventionally used compact disc as a recording medium.

It is still another object of the present invention to provide an optical disc which can be easily manufactured while realizing increase in the quantity of recording information.

It is a further object of the present invention to provide an optical disc reproducing device of a simple structure which enables simplification of the structure of an optical pickup used for reproducing information.

An optical disc according to the present invention comprises: at least a first recording layer and a second recording layer provided as being stacked on one side of a substrate; and a protection layer for protecting the recording layer located farther from the substrate, of the first recording layer and the second recording layer; wherein the reflectance of one of the first recording layer and the second recording layer is made higher than the reflectance of the other recording layer.

In this optical disc, the reflectance of the recording layer located farther from the substrate, of the first recording layer and the second recording layer, is made higher than the reflectance of the recording layer located closer to the substrate, of the first recording layer and the second recording layer.

The optical disc according to the present invention further comprises an optically transparent layer provided between the first recording layer and the second recording layer. This optically transparent layer can be used for joining the first recording layer with the second recording layer.

Another optical disc according to the present invention comprises: a first recording layer provided on one side of a substrate; a second recording layer provided in parallel to the first recording layer; and a protection layer for protecting the recording layer located farther from the substrate, of the first recording layer and the second recording layer; wherein the reflectance of one of the first recording layer and the second recording layer is made higher than the reflectance of the other recording layer.

A reproducing device according to the present invention uses, as a recording medium, an optical disc comprising at least a first recording layer and a second recording layer provided as being stacked on one side of a substrate, and a protection layer for protecting the recording layer located farther from the substrate, of the first recording layer and the second recording layer, wherein the reflectance of one of the first recording layer and the second recording layer is made higher than the reflectance of the other recording layer. The reproducing device comprises: a single light source for emitting a light beam to be cast onto the optical disc; and a single objective lens for condensing the laser beam emitted from the light source to the first recording layer or the second recording layer via the substrate.

The reproducing device further comprises: a photodetector for receiving a return light from the first recording layer or the second recording layer; a driving section for driving the objective lens at least in a direction parallel to the optical axis of the objective lens; and a control section for controlling the driving section to condense the light beam emitted from the light source onto either the first recording layer or the second recording layer.

An optical disc reproducing method according to the present invention comprises the steps of: casing a light beam emitted from a single light source to an optical disc via a single objective lens, the optical disc comprising at least a first recording layer and a second recording layer provided as being stacked on one side of a substrate, and a protection layer for protecting the recording layer located farther from the substrate, of the first recording layer and the second recording layer, wherein the reflectance of one of the first recording layer and the second recording layer is made higher than the reflectance of the other recording layer; discriminating which of the first recording layer and the second recording layer the light beam emitted from the light source is cast on, on the basis of the result of detection of a reflected beam from the first recording layer or the second recording layer; and moving the objective lens in a direction parallel to the optical axis of the objective lens on the basis of the result of discrimination so as to condense the light beam emitted from the light source onto the first recording layer or the second recording layer, thus reproducing information recorded on the first or second recording layer.

The other objects and advantages of the present invention will be clarified further in the following description of embodiments.

BEST MODE FOR CARRYING OUT THE INVENTION

An optical disc according to the present invention and an optical disc reproducing device using this optical disc as a recording medium will now be described with reference to the drawings.

Figure 3:
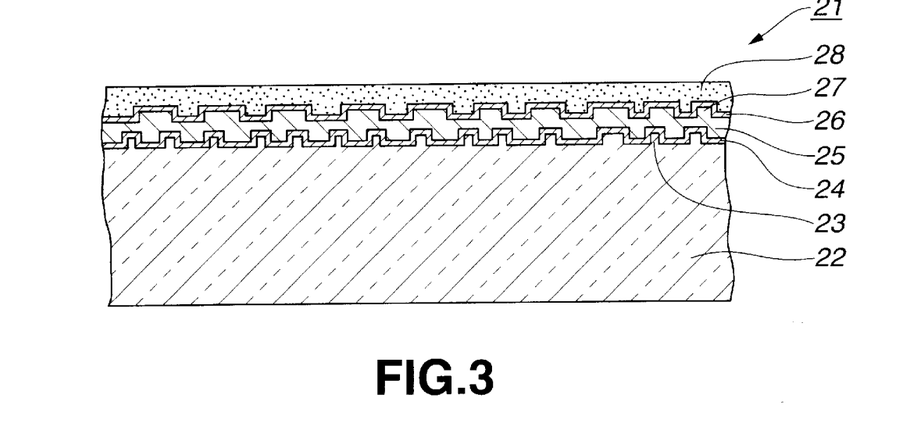
FIG. 3 is a cross-sectional view showing an optical disc according to the present invention.

An optical disc 21 according to the present invention has a substrate 22 using an optically transparent synthetic resin such as a polycarbonate resin or glass, as shown in FIG. 3. On one side of the substrate 22, a pit pattern 23 is provided, which is a minute recess/protrusion pattern corresponding to recording information. In the case where the substrate 22 is made of a synthetic resin, the pit pattern 23 is formed simultaneously with the injection-molding of the substrate 22. In the case where the substrate 22 is made of glass, the pit pattern 23 is formed by using a 2P (photo polymerization) method. In the 2P method, an optically cured resin such as an ultraviolet-cured resin is filled between the glass substrate and a disc tamper, and the optically cured resin is cured by optical irradiation from the side of the glass substrate, thus forming a recess/protrusion pattern.

The substrate 22 used for the optical disc 21 of this embodiment is formed by injection-molding a polycarbonate resin, and recording information is recorded as the pit pattern 23 on one side of the substrate 22. The substrate 22 has a thickness of approximately 1.2 mm, similarly to the substrate of a conventionally used optical disc with a diameter of 12 cm, that is, a so-called compact disc.

On the one side of the substrate 22 where the pit pattern 23 is formed, a first recording layer 24 is provided along the pit pattern 23, as shown in FIG. 3. The first recording layer 24 is formed as a semitransparent film which transmits a predetermined quantity of a laser beam cast from the side of the substrate 22 and reflects a predetermined quantity thereof. The first recording layer 24 is formed by depositing a silicon-based film of $Si_3N_4$, $SiO_2$ and the like with a thickness of approximately 100 to 500 nm. In this case, the first recording layer 24 is formed by depositing the $Si_3N_4$ film and the $SiO_2$ film in multiple layers. The $Si_3N_4$ film and the $SiO_2$ film constituting the first recording layer 24 are deposited by a vacuum evaporation method or a sputtering method.

On the first recording layer 24, a second recording layer 26 is formed via an optically transparent layer 25 made of an ultraviolet-cured resin or the like. The optically transparent layer 25 is formed to have a predetermined thickness since it serves to optically separate the first recording layer 24 and the second recording layer 26 so that these recording layers 24 and 26 are not located within the depth of focus of an objective lens which converges and casts a laser beam to the recording layers 24 and 26. Specifically, the optically transparent layer 25 is formed with a thickness of approximately 30 $\mu$m. If the optically transparent layer 25 is thinner, the optically transparent layer 25 cannot sufficiently separate the reflected light from the first recording layer 24 and the reflected light from the second recording layer 26 and it is difficult to accurately detect each reflected light. On the other hand, if the optically transparent layer 25 is too thick, it may generate spherical aberration or the like. Therefore, an appropriate thickness is selected in consideration of these characteristics.

The optically transparent layer 25 is formed by applying an ultraviolet-cured resin or the like by a spin coat method. Alternatively, the optically transparent layer 25 may be formed by stacking an ultraviolet-cured resin or the like with a thickness of approximately, 5 to 10 $\mu$m for a plurality of times. The optically transparent layer 25 may also be formed by attaching a transparent sheet.

On one side of the optically transparent layer 25, a pit pattern 27 is formed, which is a minute recess/protrusion pattern corresponding to information recorded on the second recording layer 26. The pit pattern 27 can be formed by the above-described 2P method used for forming a pit pattern on the glass substrate.

The second recording layer 26 is formed as it is stacked along the pit pattern 27 formed on one side of the optically transparent layer 25. The second recording layer 26 is formed by depositing a film made of a material capable of securing a high reflectance such as aluminum (Al), gold (Au), silver (Ag) or the like, in order to efficiently reflect a laser beam transmitted through the first recording layer 24 and cast onto the second recording layer 26, to an optical pickup located on the side of the substrate 22. On the second recording layer 26, a protection layer 28 made of an ultraviolet-cured resin or the like is provided for protecting the surface of the second recording layer 26. The protection layer 28 is formed by applying the ultraviolet-cured resin or the like by spin-coating and then irradiating the resin with ultraviolet rays to solidify the resin.

Figure 4:
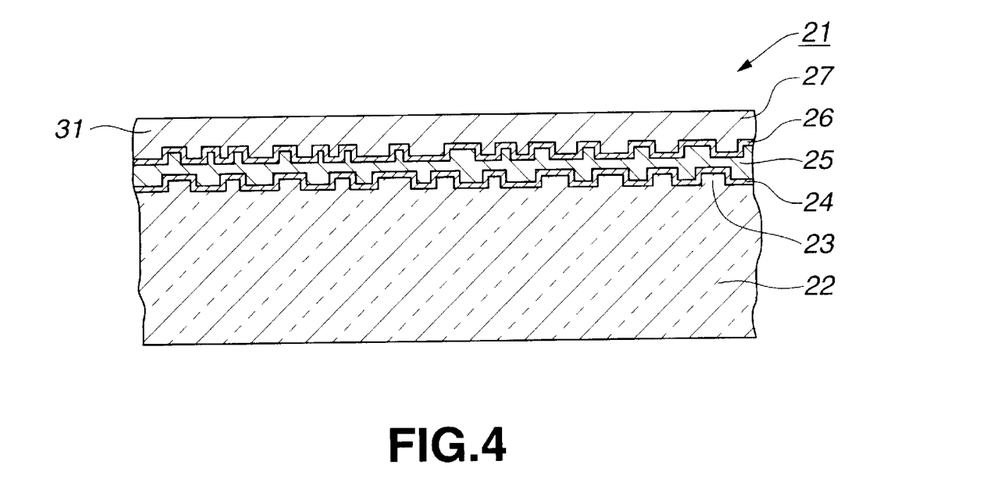
FIG. 4 is a cross-sectional view showing another example of the optical disc according to the present invention.

In the above-described optical disc 21, the second recording layer 26 is formed by using the above-described 2P method. However, as shown in FIG. 4, a sheet member 31 which has the pit pattern 27 formed on its one side and which has the second recording layer 26 formed in advance along the pit pattern 27 by depositing a film made of a mate rial capable of securing a high reflectance such as aluminum (Al), gold (Au), silver (Ag) or the like may be joined onto the first recording layer 24. The sheet member 31 is joined onto and in parallel to the first recording layer 24 in such a manner that the second recording layer 26 faces the first recording layer 24. In this case, the optically transparent layer 25 made of an ultraviolet-cured resin or the like is used as an adhesive layer.

The sheet member 31 can be formed by using a synthetic resin such as a polycarbonate resin or the like. In the optical disc 21 which uses the sheet member 31 to constitute the second recording layer 26, the sheet member 31 functions as a protection layer for the second recording layer 26 and therefore it is not necessary to separately provide a protection layer.

Meanwhile, since the optical disc 21 according to the present invention is adapted for reproducing the information recorded on the first and second recording layers by casting a laser beam from the side of the substrate 22 and then detecting a return light beam reflected from the first and second recording layers 24 and 26 by a photodetector arranged on the side of the substrate, the first recording layer 24 is formed as a semitransparent film which enables transmission of a predetermined quantity of the laser beam to the second recording layer 26, and the second recording layer 26 is formed to efficiently reflect the laser beam transmitted through the first recording layer 24 and cast onto the second recording layer 26. That is, the reflectance of the second recording layer 26 is made higher than the reflectance of the first recording layer 24.

Figure 5:
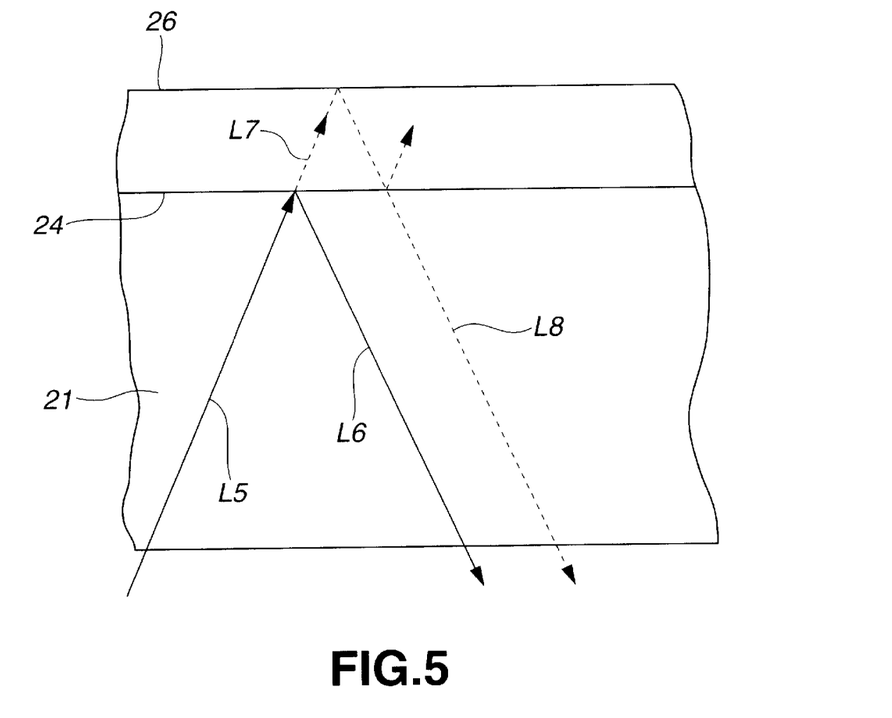
FIG. 5 shows the state where a laser beam is cast onto first and second recording layers of the optical disc according to the present invention and where the laser beam is reflected from the first and second recording layers.

More specifically, the first recording layer 24 of the optical disc 21 according to the present invention has a reflectance of 11% and the second recording layer 26 has a reflectance of 99%. On the assumption that the substrate 22 made of a polycarbonate resin has a diffusivity/absorptivity of 5% for a laser beam, when a laser beam $L_5$ is made incident from the side of the substrate 22, 10% of the laser beam is reflected as a return laser beam $L_6$ from the first recording layer 24 and 85% is transmitted through the recording layer 24 and becomes incident on the second recording layer 26, as shown in FIG. 5. Since the optically transparent layer 25 has a diffusivity/absorptivity of substantially zero for a laser beam, most of the laser beam is incident on the second recording layer 26. The laser beam $L_7$ incident on the second recording layer 26 is reflected by the second recording layer 26 having the reflectance of 99% and thus becomes a return laser beam $L_8$, which is then transmitted through the first recording layer 24 having the reflectance of 11% and the substrate 22 having the diffusivity/absorptivity of 5% and outputted to the outside of the optical disc 21. The return rate of the laser beam $L_8$ reflected from the second recording layer 26 is approximately 7% of the laser beam $L_5$, which is the first laser beam incident on the substrate 22.

As another example of the optical disc 21 according to the present invention, on the assumption that the first recording layer 24 has a reflectance of 20% and that the second recording layer 26 has a reflectance of 99%, 18% of the first laser beam $L_5$ incident on the substrate 22 from the first recording layer 24 is reflected as the return laser beam $L_6$, and approximately 57% of the first laser beam $L_5$ incident on the substrate 22 from the second recording layer 26 is reflected as the return laser beam $L_8$.

By thus making the difference in reflectance between the first recording layer 24 and the second recording layer 26, a large light quantity difference can be provided between the return laser beams $L_6$ and $L_8$ cast onto the optical disc 21 and reflected from the first and second recording layers 24 and 26. By detecting the light quantity difference between the return laser beams $L_6$ and $L_8$ of the laser beam $L_5$ incident on the optical disc 21, which of the first and second recording layers 24 and 26 the laser beam $L_5$ incident on the optical disc 21 is focused on can be easily detected.

To securely detect the first or second recording layer 24 or 26 by detecting the light quantity difference between the return laser beams $L_6$ and $L_8$ reflected from the first and second recording layers 24 and 26, it is desired that there is a difference of approximately 15% or more between the reflectance of the first recording layer 24 and that of the second recording layer 26. As the difference of approximately 15% or more in the reflectance is provided, even in the case where the substrate 22 having a diffusivity/absorptivity of approximately 5% for a laser beam is used, a light quantity difference of 10% or more can be secured between the return laser beams $L_6$ and $L_8$ reflected from the first and second recording layers 24 and 26, and detection of the first or second recording layer 24 or 26 can be securely carried out by detecting the light quantity difference between the return laser beams $L_6$ and $L_8$.

In the optical disc 21, by setting the reflectance of the second recording layer 26 at 50% or higher when the reflectance of the first recording layer 24 is 11%, 10% of the laser beam $L_5$ incident on the optical disc 21 from the first recording layer 24 can be obtained as the return light beam $L_6$ while approximately 37% of the laser beam $L_5$ incident on the optical disc 21 from the second recording layer 26 can be obtained as the return laser beam $L_8$. By setting the reflectance of the second recording layer 26 at 50% or higher when the reflectance of the first recording layer 24 is 20%, 18% of the laser beam $L_5$ incident on the optical disc 21 from the first recording layer 24 can be obtained as the return light beam $L_6$ while a return light quantity of approximately 128% of the laser beam $L_5$ incident on the optical disc 21 from the second recording layer 26 can be obtained. Thus, a light quantity difference of 10% or more can be secured between the return laser beams $L_6$ and $L_8$ reflected from the first and second recording layers 24 and 26, and detection of the first or second recording layer 24 or 26 can be securely carried out by detecting the light quantity difference between the return laser beams $L_6$ and $L_8$.

Moreover, in the optical disc 21, by setting the reflectance of the second recording layer 26 at 50% or higher when the reflectance of the first recording layer 24 is 30% or lower, at least 28% of the laser beam $L_5$ incident on the optical disc 21 from the first recording layer 24 can be obtained as the return light beam $L_6$ while approximately 9% or more of the laser beam $L_5$ incident on the optical disc 21 from the second recording layer 26 can be obtained as the return laser beam $L_8$.

By thus setting the reflectance of the first recording layer 24 for the first laser beam $L_5$ incident thereon to 30% or lower, and securing the reflectance of 50% or more as the reflectance of the second recording layer 26 for the laser beam $L_7$ transmitted through the first recording layer 24 and incident on the second recording layer 26, the return laser beam $L_8$ of approximately 9% or more can be obtained from the second recording layer 26 while a light quantity difference of 10% or more can be secured between the return laser beams $L_6$ and $L_8$ reflected from the first and second recording layers 24 and 26. As the return laser beam $L_8$ of at least 9% or more is obtained, it is possible to reproduce the information recorded on the first and second recording layers 24 and 26 by an optical disc reproducing device using a conventional write-once compact disc.

In the optical disc 21, the first recording layer 24 is formed as a low-reflectance layer with a reflectance of 30% or lower, and the return light quantity from the second recording layer 26 is made greater than the return light quantity from the first recording layer 24. However, the relation between the return light quantities of the first and second recording layers 24 and 26 may be the reverse.

For example, if the reflectance of the first recording layer 24 is 78% and the reflectance of the second recording layer 26 is 99%, approximately 70% of the original laser beam is reflected from the first recording layer 24 as the return laser beam $L_6$ and approximately 4% is reflected from the second recording layer 26 as the return laser beam $L_8$.

On the other hand, if the reflectance of the first recording layer 24 is 60% and the reflectance of the second recording layer 26 is 99%, approximately 54% of the original laser beam is reflected from the first recording layer 24 as the return laser beam $L_6$ and approximately 15% is reflected from the second recording layer 26 as the return laser beam $L_8$.

Furthermore, if the reflectance of the first recording layer 24 is 50% and the reflectance of the second recording layer 26 is 99%, approximately 45% of the original laser beam is reflected from the first recording layer 24 as the return laser beam $L_6$ and approximately 21% is reflected from the second recording layer 26 as the return laser beam $L_8$. In this case, too, a light quantity difference of 10% or more can be secured between the return laser beams $L_6$ and $L_8$ reflected from the first and second recording layers 24 and 26, and detection of the first or second recording layer 24 or 26 can be securely carried out by detecting the light quantity difference between the return laser beams $L_6$ and $L_8$.

Figure 6:
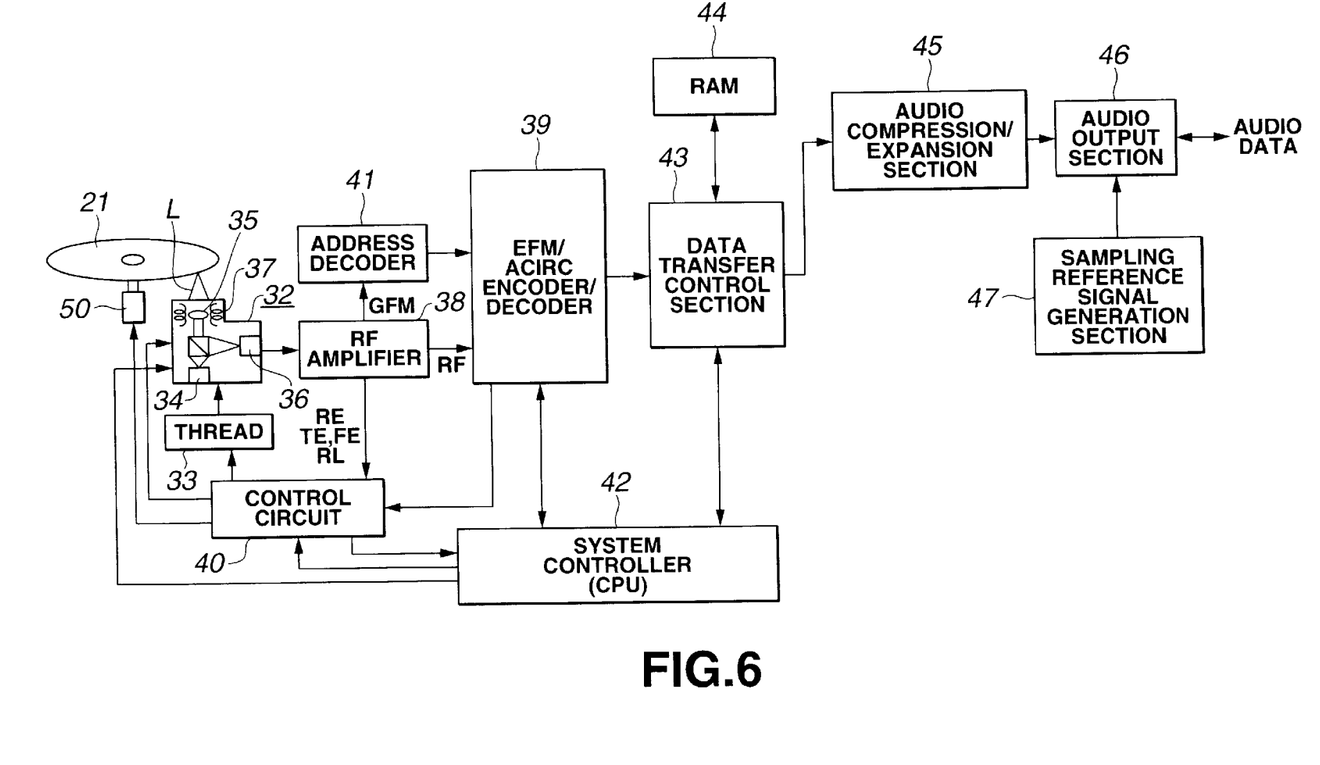
FIG. 6 is a block circuit diagram showing an optical disc reproducing device in which the optical disc according to the present invention is used.

An optical disc reproducing device for reproducing the optical disc 21 having the first and second recording layers 24 and 26 with different reflectances as described above has a spindle motor 50 for rotationally driving the optical disc 21, and an optical pickup 32 for scanning with a laser beam L the first or second signal recording layer 24 or 26 of the optical disc 21 rotationally driven by the spindle motor 50, thus reading the information recorded on the first or second signal recording layer 24 or 26, as shown in FIG. 6. The optical pickup 32 is shifted in the radial direction of the optical disc 21 by a pickup shift mechanism 33.

The optical pickup 32 has a semiconductor laser 34 as a light source for emitting a laser beam L to be incident on the optical disc 21, for example, a laser beam with a wavelength of 780 nm, an optical element such as an objective lens 35 for selectively converging and casting the laser beam L emitted from the semiconductor laser 34 to the first or second signal recording layer 24 or 26, and a photodetector 36 for detecting a return laser beam reflected from the first or second signal recording layer 24 or 26. The objective lens 35 is supported by an actuator 37 so as to be displaceable in two directions orthogonal to each other, that is, a focusing direction parallel to the optical axis of the objective lens 35 and a tracking direction in the planar direction orthogonal to the optical axis of the objective lens 35, and is driven and displaced in the focusing direction and/or the tracking direction on the basis of a focusing error signal and/or a tracking error signal obtained by detecting the return laser beam.

The focal position of the objective lens 35 with respect to the first or second recording layer 24 or 26 is controlled on the basis of a control signal obtained by detecting the light quantity of the return laser beam reflected from the first or second recording layer 24 or 26 of the optical disc 21.

The optical disc 21 is rotationally driven by the spindle motor 50 and the optical pickup 32 is driven. Then the laser beam L is emitted from the optical pickup 32, and the first or second recording layer 24 or 26 of the optical disc 21 is scanned with the laser beam L. Then, the return laser beam L from the first or second recording layer 24 or 26 is detected by the photodetector 36. The detection signal detected by the photodetector 36 is supplied to an RF amplifier 38. The RF amplifier 38 carries out arithmetic processing on the detection signal supplied from the photodetector 36, thereby extracting a reproduction RF signal, a tracking error signal TE, a focusing error signal FE, a reflected light quantity detection signal RL, and group information GFM, which is the absolute position information recorded on the optical disc 21.

The extracted reproduction RF signal is supplied to an encoder/decoder section 39. The tracking error signal TE, the focusing error signal FE, and the reflected light quantity detection signal RL are supplied to a control circuit 40. The group information GFM is supplied to an address decoder 41.

In this optical disc reproducing device, the first or second recording layer 24 or 26 is selected on the basis of the reflected light quantity detection signal RL supplied to the control circuit 40 and a selection command for selecting the first or second recording layer 24 or 26 from a system controller 42, and the objective lens 35 is controlled to the position for focusing the laser beam L emitted from the light source 34 to the first or second recording layer 24 or 26. For example, as the method for detecting the difference in reflected light quantity, it is possible to employ a method in which a peak value of the detection signal supplied from the photodetector 36 is detected and compared with a reference value by the RF amplifier 38, or a method in which the detection signal from the photodetector 36 is binarized by the RF amplifier 38 and in which comparison with the binarized signal is carried out. As a result of detection of the difference in reflected light quantity, the control circuit 40 detects which of the first recording layer 24 and the second recording layer 26 of the optical disc 21 the laser beam L is cast and focused on, and supplies the result of detection to the system controller 42. The system controller 42 supplies a focusing offset value, that is, a DC component of a focusing servo signal generated on the basis of the focusing error signal FE supplied to the biaxial actuator 37, to the control circuit 40 as a control signal so that the laser beam L is focused on the recording layer selected on the basis of the result of detection supplied from the control circuit 40. The control circuit 40 switches the DC component of the focusing servo signal supplied to the biaxial actuator 37 between the first recording layer 24 and the second recording layer 26 on the basis of the control signal supplied from the system controller 42. To the biaxial actuator 37, the focusing servo signal having the DC component corresponding to the recording layer on which the laser beam L is condensed is supplied from the control circuit 40. As a result, only the DC component of the focusing servo signal is shifted in the direction parallel to the optical axis of the objective lens 35, and therefore the laser beam L emitted from the semiconductor laser 34 is condensed on the selected one of the first recording layer 24 and the second recording layer 26.

To the biaxial actuator 37, a tracking servo signal generated on the basis of the tracking error signal TE is supplied from the control circuit 40.

The control circuit 40 generates various servo driving signals in accordance with the focusing error signal FE and the push-pull signal PP supplied thereto, a track jump command and an access command from the system controller 42 made up of a microcomputer, a rotation speed detection information from the spindle motor 50 and the like. The control circuit 40 thus controls the biaxial actuator 37 and the pickup shift mechanism 33 to carry out focusing and tracking control, and also controls the spindle motor 50 to rotate at a constant linear velocity (CLV).

The address decoder 41 decodes the groove information GFM supplied thereto and thus extracts address information. This address information is supplied to the system controller 42 and used for various control operations.

The encoder/decoder section 39 binarizes the reproduction RF signal supplied from the RF amplifier 38, then carries out demodulation, for example, by the EFM (eight to fourteen modulation) system, and further carries out decode processing for error correction by the CIRC (cross interleaved Read Solomon coding) system. The audio data on which EFM demodulation and decode processing by CIRC have been performed by the encoder/decoder section 39 is temporarily written into a buffer memory 44 by a data transfer control section 43. The audio data read out from the buffer memory 44 is supplied to an audio compression/expansion processing section 45. The audio data supplied to the audio compression/expansion processing section 45 is supplied to an audio output section 46. The audio output section 46 converts an audio sampling signal outputted from the audio compression/expansion processing section 45 into an audio signal in accordance with a reference signal generated by a sampling reference signal generation section 47, and outputs the audio signal to the outside.

In the case of reproducing the information recorded on the recording layer having the lower reflectance, of the first and second recording layers 24 and 26, it is desired that the system controller 42 carries out control so as to increase the gain of the reproduction RF signal.

The optical disc 21 according to the present invention used for this optical disc reproducing device has the first recording layer 24 and the second recording layer 26, as described above. In this case, since the difference in reflectance of 10% or more can be secured in the reflection from the first and second recording layers 24 and 26 can be secured by setting the reflectance of the first recording layer 24 and the second recording layer 26 so that the difference in reflectance for the laser beam L incident on the optical disc 21 is 15% or more, detection of the first or second recording layer 24 or 26 can be securely carried out.

The optical disc reproducing device according to the present invention controls the position of the objective lens 35 in the focusing direction and thus selects the focal position of the laser beam L onto the first or second recording layer 24 or 26. Therefore, reproduction of the information recorded on the first and second recording layers 24 and 26 can be carried out by using the laser beam L with a single wavelength emitted from the single light source.

In this case, if information is recorded onto the first and second recording layers 24 and 26 in the format of the conventionally used compact disc, a laser beam with a wavelength of 780 nm can be used and reproduction can be carried out also in the conventionally used optical disc reproducing device.

With the optical disc 21 according to the present invention, if information is recorded onto only one of the first and second recording layers 24 and 26 in the format of the compact disc, it is possible to reproduce only the information recorded on the one recording layer 24 or 26 by using the conventionally used optical disc reproducing device.

INDUSTRIAL APPLICABILITY

As described above, in the optical disc according to the present invention, the difference in reflectance is provided between the first and second signal recording layers of the multilayer structure, and the difference in light quantity of the return laser beams reflected from the first and second signal recording layers is detected, thereby enabling selection of the first or second signal recording layer. Thus, it is possible to easily select the recording layer and carry out reproduction of information.

Also, since reproduction of the information recorded on the first and second signal recording layer can be carried out by using a laser beam with the same wavelength, the structure of the optical disc device is simplified and the manufacture thereof is facilitated.

What is claimed is:

1. An optical disc comprising:
    a substrate;
    at least a first recording layer and a second recording layer being stacked on one side of the substrate;
    a protection layer for protecting the recording layer, among the first recording layer and the second recording layer, located farther from the substrate; and
    an optically transparent layer provided between the first recording layer and the second recording layer;
    wherein a reflectance of one of the first recording layer and the second recording layer is made higher than a reflectance of the other recording layer;
    wherein a recess/protrusion pattern is formed on the one side of the substrate and wherein the recording layer, among the first recording layer and the second recording layer, located closer to the substrate, covers the recess/protrusion pattern;
    wherein a further recess/protrusion pattern is formed on a surface of the protection layer facing the recording layer, among the first recording layer and the second recording layer, located farther from the substrate and wherein the recording layer located farther from the substrate covers the further recess/protrusion pattern;
    wherein the second recording layer and the further recess/protrusion pattern may optionally be pre-formed on one side of a sheet member and the sheet member being joined onto the first recording layer using the transparent layer as an adhesive layer.

2. The optical disc as claimed in claim 1, wherein the reflectance of the recording layer, among the first recording layer and the second recording layer, located farther from the substrate, is made higher than the reflectance of the recording layer, among the first recording layer and the second recording layer, located closer to the substrate.

3. The optical disc as claimed in claim 2, wherein the optically transparent layer is made of an optically cured resin and has a further recess/protrusion pattern formed on its surface facing the second recording layer, and wherein the second recording layer covers the further recess/protrusion pattern.

4. The optical disc as claimed in claim 2, wherein the reflectance of the recording layer located farther from the substrate is approximately 50% or higher.

5. The optical disc as claimed in claim 2, wherein the reflectance of the recording layer located farther from the substrate is approximately 70% or higher.

6. The optical disc as claimed in claim 2, wherein the reflectance of the recording layer located closer to the substrate is approximately 30% or lower.

7. The optical disc as claimed in claim 2, wherein a difference between the reflectance of the first recording layer an d the reflectance of the second recording layer is 15% or more.

8. The optical disc as claimed in claim 1, wherein the substrate is made of an optically transparent material with a thickness of approximately 1.2 mm.

9. An optical disc comprising:
  a substrate;
  a first recording layer provided on one side of the substrate;
  a second recording layer provided in parallel to the first recording layer;
  a protection layer for protecting the recording layer, among the first recording layer and the second recording layer, located farther from the substrate; and
  an optically transparent layer provided between the first recording layer and the second recording layer;
  wherein a reflectance of one of the first recording layer and the second recording layer is made higher than a reflectance of the other recording layer;
  wherein a recess/protrusion pattern is formed on the one side of the substrate and wherein the recording layer, among the first recording layer and the second recording layer, located closer to the substrate, covers the recess/protrusion pattern;
  wherein a further recess/protrusion pattern is formed on a surface of the protection layer facing the recording layer, among the first recording layer and the second recording layer, located farther from the substrate and wherein the recording layer located farther from the substrate covers the further recess/protrusion pattern;
  wherein the second recording layer and the further recess/protrusion pattern may optionally be pre-formed on one side of a sheet member and the sheet member being joined onto the first recording layer using the transparent layer as an adhesive layer.

10. The optical disc as claimed in claim 9, wherein the reflectance of the recording layer, among the first recording layer and the second recording layer, located farther from the substrate is made higher than the reflectance of the recording layer, among the first recording layer and the second recording layer, located closer to the substrate.

11. The optical disc as claimed in claim 10, wherein the optically transparent layer is made of an optically cured resin and has a further recess/protrusion pattern formed on its surface facing the second recording layer, and wherein the second recording layer covers the further recess/protrusion pattern.

12. The optical disc as claimed in claim 10, wherein the reflectance of the recording layer located farther from the substitute is approximately 50% or higher.

13. The optical disc as claimed in claim 10, wherein the reflectance of the recording layer located farther from the substitute is approximately 70% or higher.

14. The optical disc as claimed in claim 10, wherein the reflectance of the recording layer located closer to the substrate is approximately 30% or lower.

15. The optical disc as claimed in claim 9, wherein a difference between the reflectance of the first recording layer and the reflectance of the second recording layer is approximately 15% or more.

16. The optical disc as claimed in claim 9, wherein the substrate is made of an optically transparent material with a thickness of approximately 1.2 mm.

17. An optical disc reproducing device comprising:
  a single light source for emitting a light beam to be cast onto an optical disc, the optical disc comprising a substrate, at least a first recording layer and a second recording layer being stacked on one side of the substrate, and a protection layer for protecting the recording layer, among the first recording layer and the second recording layer, located farther from the substrate, wherein a reflectance of one of the first recording layer and the second recording layer is made higher than a reflectance of the other recording layer;
  a single objective lens for condensing the laser beam emitted from the single light source to the first recording layer or the second recording layer via the substrate;
  a photodetector for receiving a reflected light beam from the first recording layer or the second recording layer;
  a driving section for driving the objective lens at least in a direction parallel to an optical axis of the objective lens; and
  a control section for controlling the driving section to condense the light beam emitted from the light source onto either the first recording layer or the second recording layer;
  wherein the control section discriminates which layer of the first recording layer and the second recording layer the light beam emitted from the light source is cast on, based on a detection signal from the photodetector, and generates a driving signal supplied to the driving section based on result of the discrimination.

18. The optical disc reproducing device as claimed in claim 17, wherein the control section has the driving signal generation section for generating a driving signal for driving the objective lens in parallel to the optical axis based on the detection signal from the photodetector, and a control signal generation section for generating a control signal for controlling a DC component of the driving signal based on the result of the discrimination.

19. The optical disc reproducing device as claimed in claim 17, wherein the control section discriminates which recording layer of the first recording layer and the second recording layer the light beam emitted from the single light source is cast on, on the basis of the difference in reflected light quantity based on the detection signal from the photodetector.

20. The optical disc reproducing device as claimed in claim 17, wherein the reflectance of the recording layer located farther from the substrate is approximately 50% or higher.

21. The optical disc reproducing device as claimed in claim 17, wherein the reflectance of the recording layer located farther from the substrate is approximately 70% or higher.

22. The optical disc reproducing device as claimed in claim 17, wherein the reflectance of the recording layer, among the first recording layer and the second recording layer, located closer to the substrate is approximately 30% or lower.

23. The optical disc reproducing device as claimed in claim 17, wherein a difference in reflectance between the first recording layer and the second recording layer of the optical disc is approximately 15% or more.

24. An optical disc reproducing method comprising the steps of:

casting a light beam emitted from a single light source to a first recording layer or a second recording layer of an optical disc via a single objective lens, the optical disc comprising a substrate, at least a first recording layer and a second recording layer being stacked on one side of the substrate, and a protection layer for protecting the recording layer, among the first recording layer and the second recording layer, located farther from the substrate, wherein a reflectance of one of the first recording layer and the second recording layer is made higher than a reflectance of the other recording layer;

discriminating which of the first recording layer and the second recording layer the light beam emitted from the light source is cast on, based on a result of detecting a reflected beam from one of the first recording layer and the second recording layer; and moving the objective lens in a direction parallel to an optical axis of the objective lens based on a result of discrimination so as to condense the light beam emitted from the light source onto one of the first recording layer and the second recording layer.

25. The optical disc reproducing method as claimed in claim 24, wherein which recording layer of the first recording layer and the second recording layer the light beam emitted from the light source is cast on is discriminated based on a difference in reflected light quantity based on a detection signal obtained by the detecting of the reflected beam from one of the first recording layer and the second recording layer.

* * * * *